US010076916B1

(12) United States Patent
Singh

(10) Patent No.: US 10,076,916 B1
(45) Date of Patent: Sep. 18, 2018

(54) DIGITALLY PRODUCED, PERMANENT, PEEL-OFF DECAL AND METHODS FOR PRODUCING SAME

(71) Applicant: BEL USA LLC, Medley, FL (US)

(72) Inventor: Raj Singh, Doral, FL (US)

(73) Assignee: BEL USA LLC, Medley, FL (US)

( * ) Notice: Subject to any disclaimer, the term of this patent is extended or adjusted under 35 U.S.C. 154(b) by 0 days.

(21) Appl. No.: 15/794,790

(22) Filed: Oct. 26, 2017

(51) Int. Cl.
| | | |
|---|---|---|
| *B41J 11/00* | (2006.01) | |
| *B05D 3/06* | (2006.01) | |
| *B32B 37/26* | (2006.01) | |
| *B32B 43/00* | (2006.01) | |
| *C08B 30/00* | (2006.01) | |
| *C08B 30/18* | (2006.01) | |
| *C08B 30/04* | (2006.01) | |

(52) U.S. Cl.
CPC ............ *B41J 11/0015* (2013.01); *B05D 3/06* (2013.01); *B32B 37/26* (2013.01); *B32B 43/006* (2013.01); *B05D 2518/00* (2013.01); *B32B 2037/268* (2013.01); *B32B 2307/4023* (2013.01); *B32B 2405/00* (2013.01); *C08B 30/044* (2013.01); *C08B 30/18* (2013.01)

(58) Field of Classification Search
CPC ............... B41J 3/4075; B41J 11/0015; B32B 2037/268; B32B 2307/4023; B32B 2405/00; B32B 37/26; B32B 43/006; B05D 3/06; B05D 2518/00; C08B 30/18; C08B 30/044
USPC .......................................... 156/230, 240, 247
See application file for complete search history.

(56) References Cited

U.S. PATENT DOCUMENTS

| | | | | |
|---|---|---|---|---|
| 2,216,289 A | * | 10/1940 | Asnes ................. | B44C 1/175 40/615 |
| 2,425,653 A | * | 8/1947 | Stewart .............. | B44C 1/175 427/149 |
| 3,791,841 A | * | 2/1974 | Carmellini ......... | B44C 1/1756 156/230 |
| 4,308,310 A | * | 12/1981 | Arnold ............... | B41M 3/12 156/240 |
| 5,032,449 A | * | 7/1991 | af Strom ............ | B44C 1/1756 428/195.1 |

(Continued)

OTHER PUBLICATIONS

Search for "gum-coated decal paper comprising cornstarch and dextrose dextrin" on IP.com; Jan. 2018.*

*Primary Examiner* — Sonya M Sengupta
(74) *Attorney, Agent, or Firm* — Mayback & Hoffman, P.A.; Gregory L. Mayback

(57) ABSTRACT

A method of creating a digitally printed, water-activated, peel-off and slide-on decal for permanent transfer to an object includes the steps of printing a layer of lacquer on top of a base layer of gum-coated decal paper comprising a cornstarch and dextrose coating having a thickness of between approximately 10 microns to approximately 30 microns, drying the lacquer layer for no more than 90 minutes, printing a full-color artwork with digital, light-cured printing ink in one printing pass onto the lacquer layer to produce a ready-decal sheet having a decal formed by the ink and the lacquer layer, the lacquer layer bonding to the ink and being sandwiched between the cornstarch and dextrose coating and the ink and—having a thickness of between approximately 150 micrometers and approximately 300 micrometers, and—curing the ink with light.

22 Claims, 8 Drawing Sheets

(56) References Cited

U.S. PATENT DOCUMENTS

| | | | | |
|---|---|---|---|---|
| 5,098,772 A | * | 3/1992 | af Strom | B44C 1/165 427/149 |
| 2005/0159536 A1 | * | 7/2005 | Smith | C08J 3/03 524/501 |
| 2007/0110966 A1 | * | 5/2007 | Warren | B41M 3/12 428/195.1 |

* cited by examiner

DIGITALLY PRODUCED, PERMANENT, PEEL-OFF DECAL AND METHODS FOR PRODUCING SAME

STATEMENT REGARDING FEDERALLY SPONSORED RESEARCH OR DEVELOPMENT

Not Applicable

FIELD OF THE INVENTION

The present systems, apparatuses, and methods lie in the field of decals. The present disclosure relates to a digitally produced, water-activated, peel-off and slide-on decal, and methods for producing same, for permanent transfer to an object having various surface types including, for example, ceramic, metal (including stainless steel and aluminum), plastic, acrylic, wood, and glass. Such objects include cups, mugs, glassware, tumblers (such as sport bottles and water bottles), and are, typically, used for retail sales and promotional purposes.

BACKGROUND OF THE INVENTION

Permanent transfer of art to objects, especially promotional objects, has been in existence for many decades. Because permanent adhesion is required, modern day decals used with or within promotional products are screen-printed. A traditional process for creating the decal applies the CMYK process, which is a subtractive color model used in color printing and also is used to describe the printing process itself. CMYK refers to the four inks used in the color printing: cyan, magenta, yellow and "key" (i.e., black).

In this standard printing process, color separations are generated for each color to be printed. FIG. 1, for example, shows a color separation display for a magenta negative of this four-color process. This means that, for every multi-color design, individual screens must be made for each color to be printed, which is a significant expense, and which is multiplied for each screen produced. FIGS. 2 and 3 show exemplary screens that are created by taking one of the various color negatives and exposing that negative design to an unexposed sheet of vellum to produce the actual, physical printing screen that is framed and then placed into a screen-printing press and used for transferring one of the colors to the object to be produced. To burn the negative onto the vellum, the vellum is first coated with a light-sensitive emulsion. The color separation pattern is exposed onto the vellum, resulting in a pattern that corresponds to that particular color needed to make the final artwork after all of the other colors are printed as well. Because each color and cover layer requires its own screen, there is a possibility that seven total screens need to be produced for any given artwork, one for white, four for each of the CMYK colors, one for a clear coat (e.g., as a protective layer), and one for a cover coat. Once all of the screens are produced for each of the colors, they can be used successively in a screen-printer to create a multi-color final printed decal, such as those shown in FIGS. 4 and 5. But the final printed decal is not created until every one of the independent color screens is used and individually printed with the respective color onto the decal base substrate.

A typical decal-creation process starts by printing a white base on the decal base substrate. One exemplary embodiment of the base substrate is white gum-coated paper, which is a material that allows the inks to first be printed thereon but later to slide off the base after being appropriately wetted. Such paper typically has a gum adhesive backing that allows one to create label products for a variety of purposes. Gummed paper requires water to activate the adhesive. Gummed paper is manufactured with a dry gum adhesive or a dextrin gum adhesive. Once the adhesive is activated, the paper will adhere to the item to be labeled. (Gummed paper is different from a pressure sensitive adhesive paper, which does not require wetting to activate the adhesive.)

As indicated above, for many applications (such as those shown in FIGS. 4 and 5), the decal has, as its first layer, a printing of white ink along the entire surface (or most of the surface) of the gum-coated paper. This white base ink layer must be allowed to dry completely before any other color can be printed on top of the white background so created. Each layer of ink is subsequently screen-printed, one color at a time, on top of the white base. Significantly, each ink layer must be allowed to dry individually, thereby, increasing production time and decreasing overall production throughput. The required drying between each color printing also increases cost. The second-to-last layer to be applied is a clear varnish that is used as a protective layer for the ink layers to increase scratch resistance and protect the colors. The last step of producing a prior art decal is to apply a clear overcoat. All of the ink printed prior to the cover coat adheres to the cover coat in this final printing step to produce a finished decal on top of the base substrate. In this way, the overcoat layer is used as a carrier for the ink layers so that, when the entire decal is wetted to activate the adhesive of the base substrate, the ink layers protected underneath the overcoat can slide off the base substrate. FIGS. 5 and 6 show an example of a finished decal on a base substrate with many different artworks printed one base substrate and FIG. 6 illustrates a base substrate on which is printed a white base layer, all of the color layers, the overcoat layer, and the cover coat. When created using this prior art screen-printing process, a decal is generated in hours, but it cannot be used for days due to the drying time that is required for the entire completed decal(s) sheet before transfer of the decal can be effected.

More specifically, the decal-containing base substrate needs to go through a number of post-printing processes. First, as shown in FIG. 7, each base substrate needs to be dried. Because the final decals are wetted in order to transfer them to the object, these substrates need to be completely dry before further processing of the decals can occur. This drying process takes a considerable amount of time, typically from four to eight hours. As multiple decals are present on a single decal-containing base substrate, processing efficiency requires the decals to be separated from other different decals by cutting, but only after many of the base substrates are layered together in a stack. Because the decals will be destroyed if the decal-containing base substrates stick to one another when placed in a stack, a slip-sheet (e.g., of wax paper) must be placed in between the adjacent sheets. This step is shown in FIG. 8, for example, in which a stack of decal-containing base substrates are separated with slip-sheets. Again, this post-processing step adds time, adds cost, and decreases production throughput. FIG. 9 shows the stack of decal-containing base substrates in an intermediate post-processing step where groups of decals 1 are separated from other groups of decals 1 or from individual decals 2. Such cutting typically takes place with a guillotine-type cutter 3. After cutting, as shown in FIGS. 10 and 11, the different projects are sorted, for example, for different customers.

The objects are, then, ready to be decorated with the respective decal(s). First, the decal is wetted. This moisture activates the adhesive supplied to the decal from the base substrate to permit the wet final sticker to slide off the base substrate and allow a human installer to place the wetted final sticker onto the object before the adhesive fully dries, at which time the decal can no longer be removed without destroying the decal or damaging the object, or both. In FIG. 12, for example, the object to receive a decal is a water bottle. The wetted decal is allowed to dry, typically, for approximately two hours. When dry, the installer is then able to and does peel off the cover coat, as shown in FIG. 13 in which the cover coat is partially peeled off. The object with the installed decal is then heated, as shown in FIG. 14, which heating permanently attaches the ink of the decal to the object's surface by removing all moisture and hardening the adhesive and/or ink. All totaled, previous prior art screen-printing processes—from first printing of the decal to a final product where the decal is permanently attached to the object—take four to six days to complete.

Digital print processes, as compared to screen-printed processes, print all colors at the same time in one pass. To date, digital printing processes have not been able to be used for decals, such as those for permanent attachment to objects, such as promotional materials. In particular, up until a few years ago, nothing was available. Further, LED-cured inks also were not available until about two years ago. Next, the right type of paper of digitally printing decals did not exist. While digitally printed labels existed, for example, in the food industry (labels on cans, food products, etc.), they were not resistant enough for promotional products. Accordingly, those of skill in the art have, to date, not been able to make digital printing processes work for these printing tasks. In fact, those of skill in the art have indicated that it is not even possible to print decals such as these with digital printers that print in one-step.

Thus, a need exists to overcome the problems with the prior art systems, designs, and processes as discussed above.

SUMMARY OF THE INVENTION

The systems, apparatuses, and methods described provide a digitally produced, peel-off, permanent decal that overcomes the hereinafore-mentioned disadvantages of the heretofore-known devices and methods of this general type and that digitally produces a water activated slide-on decal that is receptive to multiple surfaces including ceramic, metal (including stainless steel and aluminum), plastic, acrylic, wood, and glass. With the systems, apparatuses, and methods described, the decals so produced have permanent adhesion to the substrate.

With the foregoing and other objects in view, there is provided, a method of creating a digitally printed, water-activated, peel-off and slide-on decal for permanent transfer to an object, includes the steps of printing a layer of lacquer on top of a base layer of gum-coated decal paper comprising a cornstarch and dextrose coating having a thickness of between approximately 10 microns to approximately 30 microns, drying the lacquer layer for no more than 90 minutes, printing a full-color artwork with digital, light-cured printing ink in one printing pass onto the lacquer layer to produce a ready-decal sheet having a decal formed by the ink and the lacquer layer, the lacquer layer bonding to the ink and being sandwiched between the cornstarch and dextrose coating and the ink and—having a thickness of between approximately 150 micrometers and approximately 300 micrometers, and—curing the ink with light.

In accordance with another mode, the ready-decal sheet is wetted to release the decal from the base layer and to form an adhesive comprising the cornstarch and dextrose coating and the lacquer layer the decal is slid from the base layer and the decal is placed onto a surface of an object, and the object is dried with the decal for between approximately one hour and no more than approximately two hours and then the object is heated with the decal for between approximately forty-five minutes and no more than approximately seventy-five minutes to form a permanent bond of the decal to the surface of the object.

In accordance with a further mode, the surface of the object comprises at least one of ceramic, metal, stainless steel, aluminum, plastic, acrylic, wood, and glass.

In accordance with an added mode, the surface of the object is cleaned with at least one of a primer, flame, alcohol, and a dishwasher additive before placing the wetted ready-decal sheet onto the surface.

In accordance with an additional mode, the decal is attached to the object without a user-removed, peel-off cover coat.

In accordance with yet another mode, the object is heated with the decal in an oven at between approximately 140° C. to approximately 200° C.

In accordance with yet a further mode, the object is heated with the decal one of at approximately 150° C. for approximately forty-five minutes, at approximately 155° C. for approximately forty-five minutes, at approximately 160° C. for approximately forty-five minutes, at approximately 165° C. for approximately forty-five minutes, at approximately 150° C. for approximately fifty-five minutes, at approximately 155° C. for approximately fifty-five minutes, at approximately 160° C. for approximately fifty-five minutes, and at approximately 165° C. for approximately fifty-five minutes.

In accordance with yet an added mode, the printing, drying, printing, curing, wetting, sliding, placing, drying, and heating steps are carried out between approximately two hours and no more than approximately four hours.

In accordance with yet an additional mode, the ink is rated as approximately 350% flexible.

In accordance with again another mode, the cornstarch and dextrose coating is approximately 13 microns to approximately 20 microns thick.

In accordance with again a further mode, the cornstarch and dextrose coating is approximately 18 microns thick.

In accordance with again an added mode, printing of the artwork is carried out without separating the colors into CMYK composites.

In accordance with again an additional mode, printing of the artwork is carried out without creating individual color printing screens.

In accordance with still another mode, printing of the artwork and printing of the lacquer are carried out without slip sheets.

In accordance with still a further mode, the cornstarch and dextrose coating and the lacquer create a bonding chemical that, when wetted with water, allows the lacquer and the ink above the lacquer to slide off the base layer.

In accordance with still an added mode, the ink is cured for between approximately 1 second and approximately 3 seconds, in an exemplary embodiment, with UV LEDs.

In accordance with still an additional mode, a multiplicity of full-color artworks are printed as individual decals on the lacquer layer to form the ready-decal sheet and the ready-decal sheet is trimmed into separate individual decals.

In accordance with another mode, the ready-decal sheet trimming is carried out by contour cutting each of the artworks into the separate individual decals.

In accordance with a further mode, the lacquer printing step is carried out with a 350-mesh screen to form the lacquer layer having a thickness between approximately 200 micrometers and approximately 250 micrometers.

In accordance with an added mode, the lacquer layer is dried for more than approximately 30 minutes and less than approximately 70 minutes.

In accordance with an additional mode, a layer of white digital printing ink is printed onto the lacquer layer before printing the artwork onto the white digital printing ink.

In accordance with a concomitant mode, a clear layer overcoat of digital, light-cured printing ink is printed on top of the artwork as a scratch protectant.

Although the systems, apparatuses, and methods are illustrated and described herein as embodied in a digitally produced, permanently, peel-off decal and methods for producing same, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which.

DETAILED DESCRIPTION OF THE EMBODIMENTS

Figure 1:
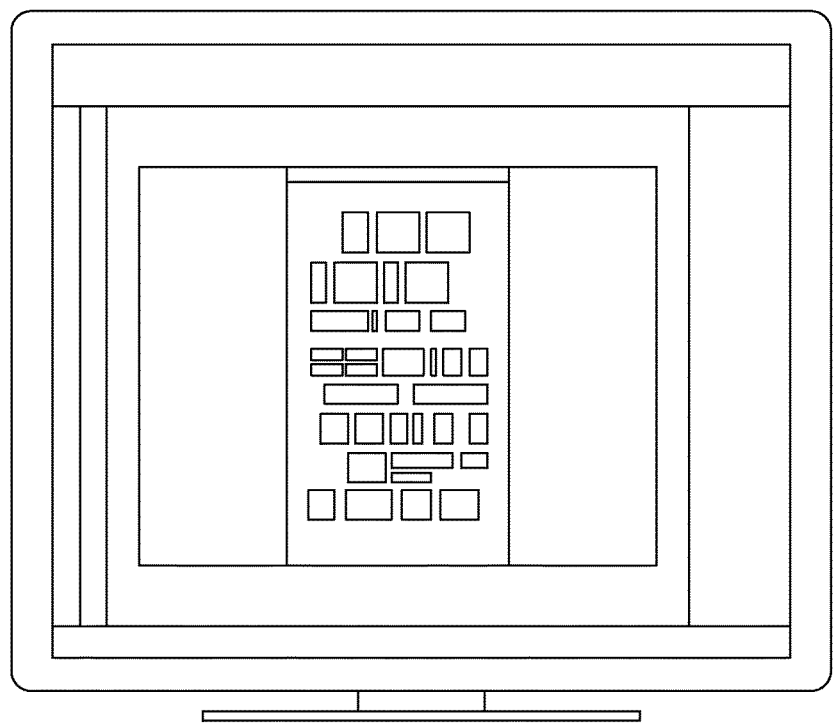
FIG. 1 is a photograph of computer display showing a prior art color separation display for a magenta negative of a prior art CMYK screen-printing process.
Figure 2:
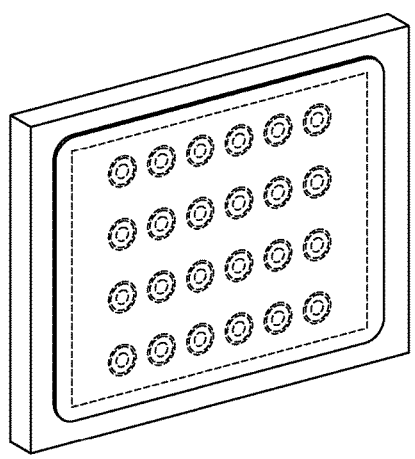
FIG. 2 is a photograph of CMYK screen-printing screens made according to the prior art CMYK screen-printing process.
Figure 3:
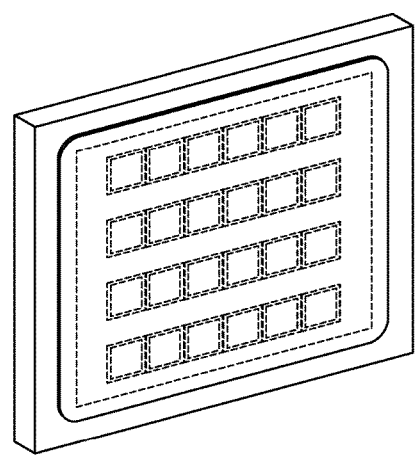
FIG. 3 is a photograph of CMYK screen-printing screens made according to the prior art CMYK screen-printing process.
Figure 4:
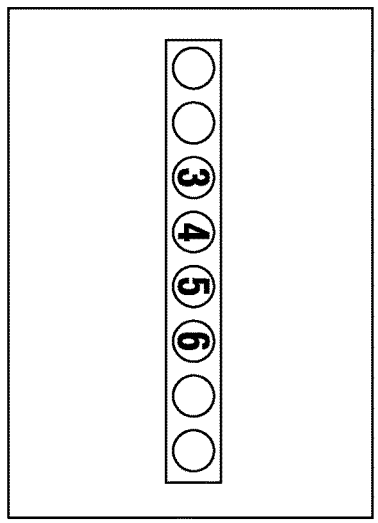
FIG. 4 is a top plan view of an example artwork printed on a base vellum according to the prior art CMYK screen-printing process.
Figure 5:
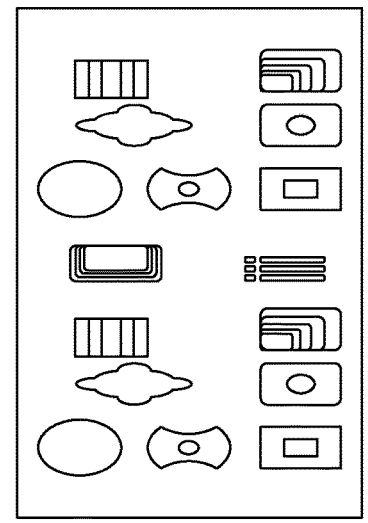
FIG. 5 is a perspective view of a sheet of exemplary decal artworks printed on a single base vellum according to the prior art CMYK screen-printing process.
Figure 6:
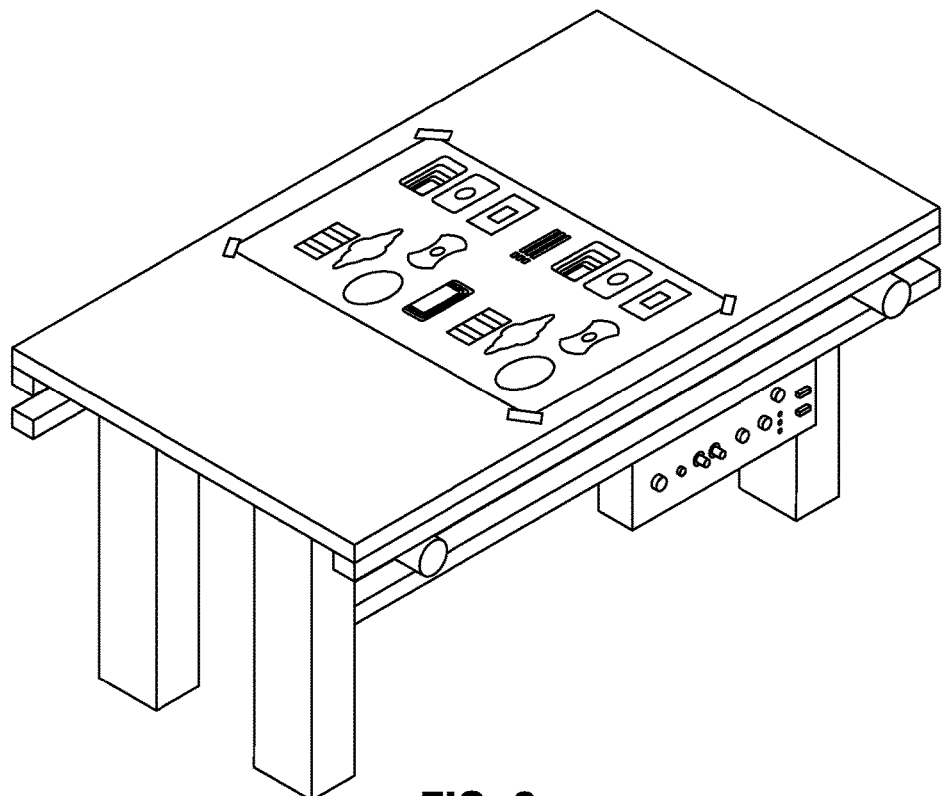
FIG. 6 is a photograph of a perspective view of a sheet of exemplary decal artworks printed on a single base vellum with a cover coat according to the prior art CMYK screen-printing process.
Figure 7:
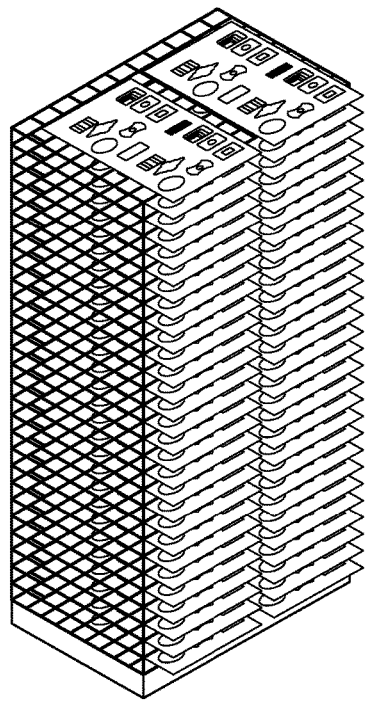
FIG. 7 is a photograph of a perspective view of a drying rack holding many decal substrate sheets printed according to the prior art CMYK screen-printing process.
Figure 8:
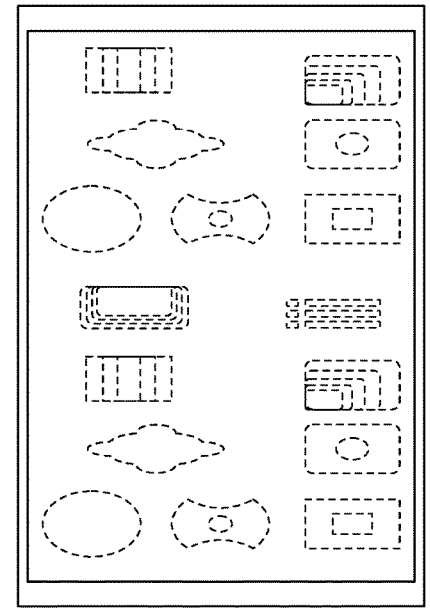
FIG. 8 is a photograph of a perspective view of stack of decal substrate sheets printed according to the prior art CMYK screen-printing process with intermediate slip-sheets.
Figure 9:
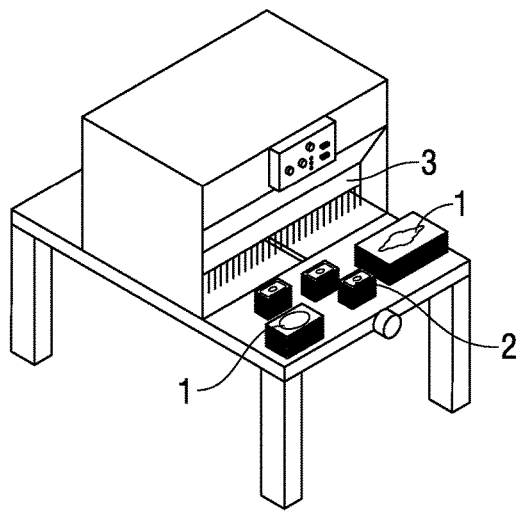
FIG. 9 is a photograph of a perspective view of the stack of decal substrate sheets of FIG. 8 cut with a guillotine-type cutter.
Figure 10:
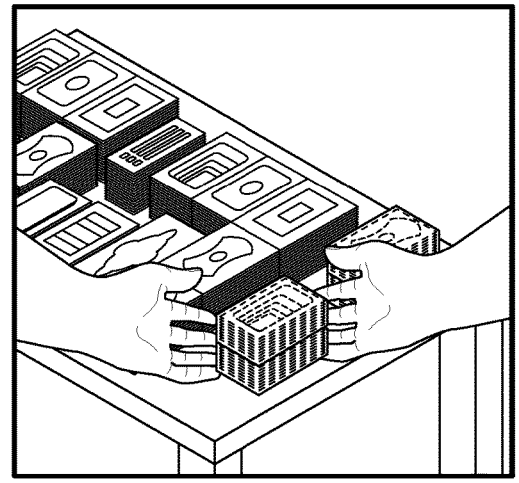
FIG. 10 is a photograph of a perspective view of a worker sorting decals cut from the substrate sheets of FIG. 8.
Figure 11:
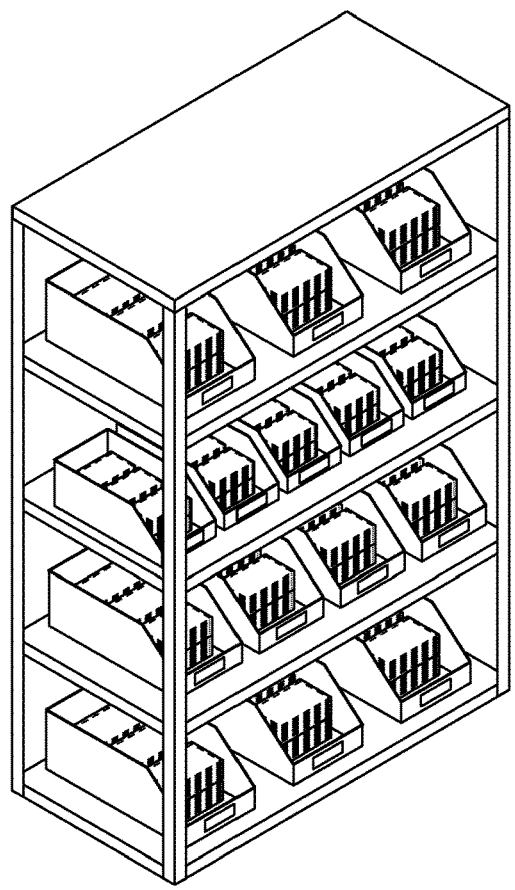
FIG. 11 is a photograph of a perspective view of a sorting rack containing sorted decals cut from the substrate sheets of FIG. 8.
Figure 12:
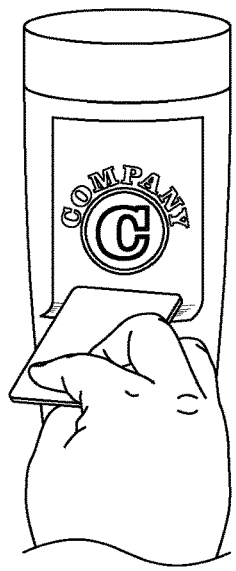
FIG. 12 is a photograph of a perspective view of a worker installing a decals cut from the substrate sheets of FIG. 8 onto a water bottle.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIGS. 15 to 21, there is shown an exemplary embodiment of systems and processes for creating a digitally produced, water-activated, peel-off and slide-on decal for permanent transfer to an object. In the exemplary embodiment, not only is(are) the decal(s) produced much faster than prior art screen-printed processes, but also many steps are entirely eliminated, which means that both the time to produce and the overall expense for creating decals is reduced substantially.

With standard digital color printing, like the printing that individuals use with modern-day desktop computers and laser or ink-jet printers, the entire, full-color artwork is printed at once. The desired final colors are not printed as overlays (i.e., like CMYK processes described above), instead the final colors are printed right away, the first time in the first pass of printing. Such printing had never been available for transferring decals permanently to objects to date, such as promotional products, because the desired permanence did not occur. Either the label peeled off (entirely or in pieces), and/or the colors deteriorated, and/or the label never adhered in a permanent manner. The exemplary embodiments described hereinbelow create decal substrates that are able to be printed digitally, at a reduced cost, and very quickly, in a matter of minutes instead of days.

Figure 15:
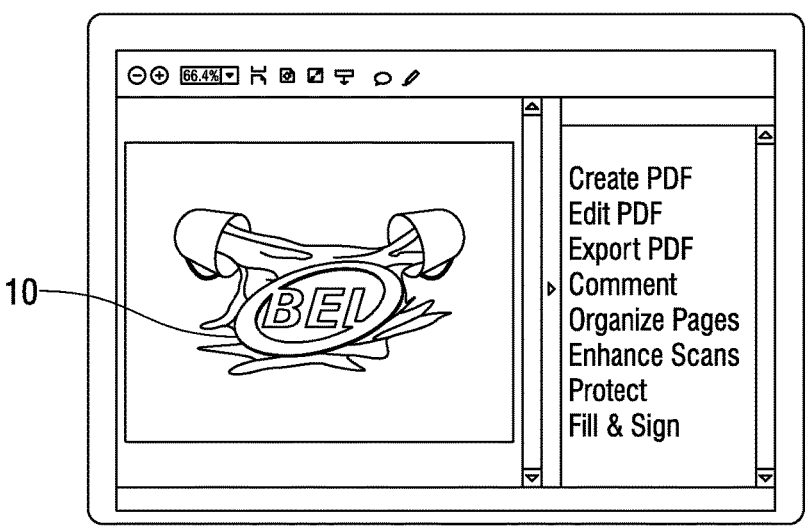
FIG. 15 is a photograph of computer display showing a full-color display of a decal to be printed in a single printing step.

In this inventive digital printing process, color separations do not need to be generated for each color to be printed. FIG. 15, for example, shows a full-color, final-version graphic for an example decal artwork 10 that is desire to be placed on an object. This artwork 10 is created by the artist and is never separated into the CMYK components for printing individual colors. This means that, for every multi-color design, individual screens do not have to be made for each color to be printed, which is a significant savings in expense because the cost of each screen is multiplied by the number of colors and/or treatments needed. Not only are the individual screens entirely eliminated, the entire process for separating the colors into the CMYK composites is eliminated entirely as well. In comparison to the prior art, the inventive systems and processes produce a final printed decal in one step without any screens.

Figure 16:
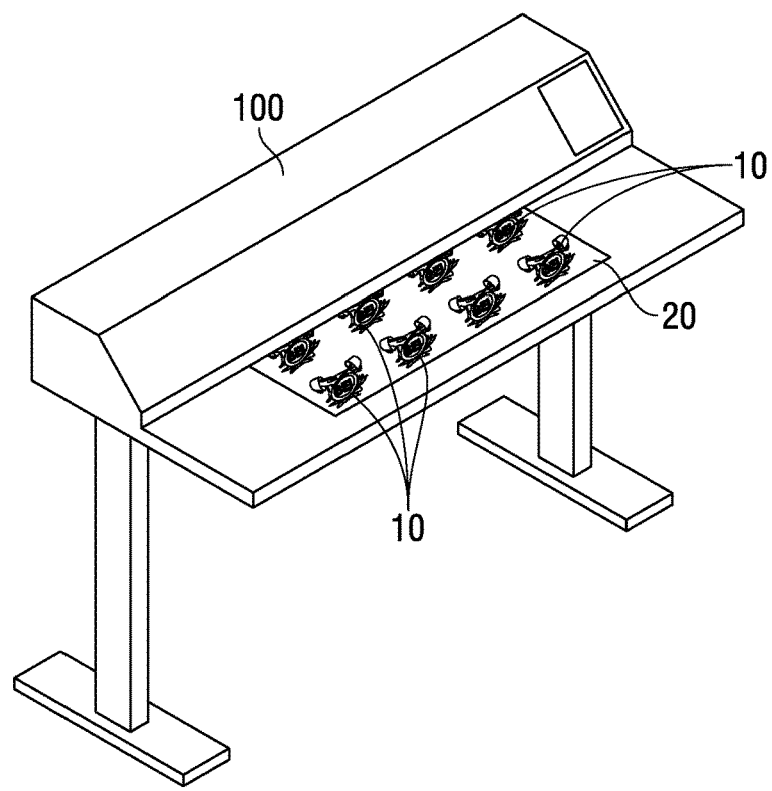
FIG. 16 is a perspective view of a sheet of exemplary decal artworks digitally printed in one pass over lacquer on a base paper.
Figure 17:
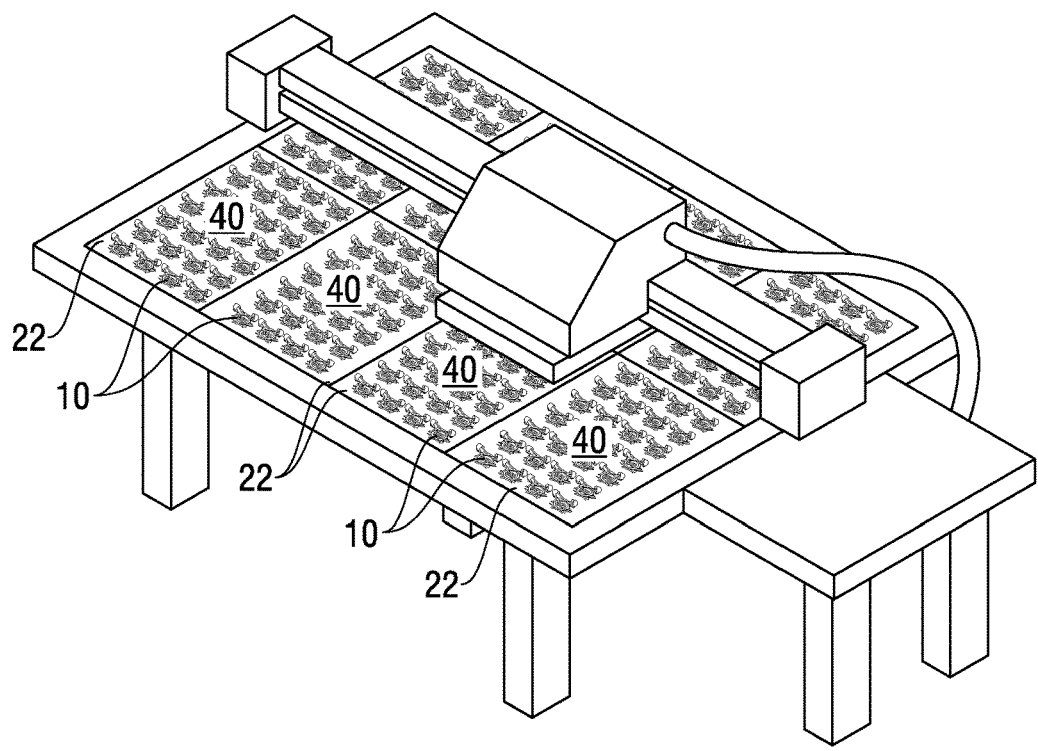
FIG. 17 is a perspective view of a plurality of sheets of exemplary decal artworks digitally printed in one pass over lacquer on a base paper.
Figure 18:
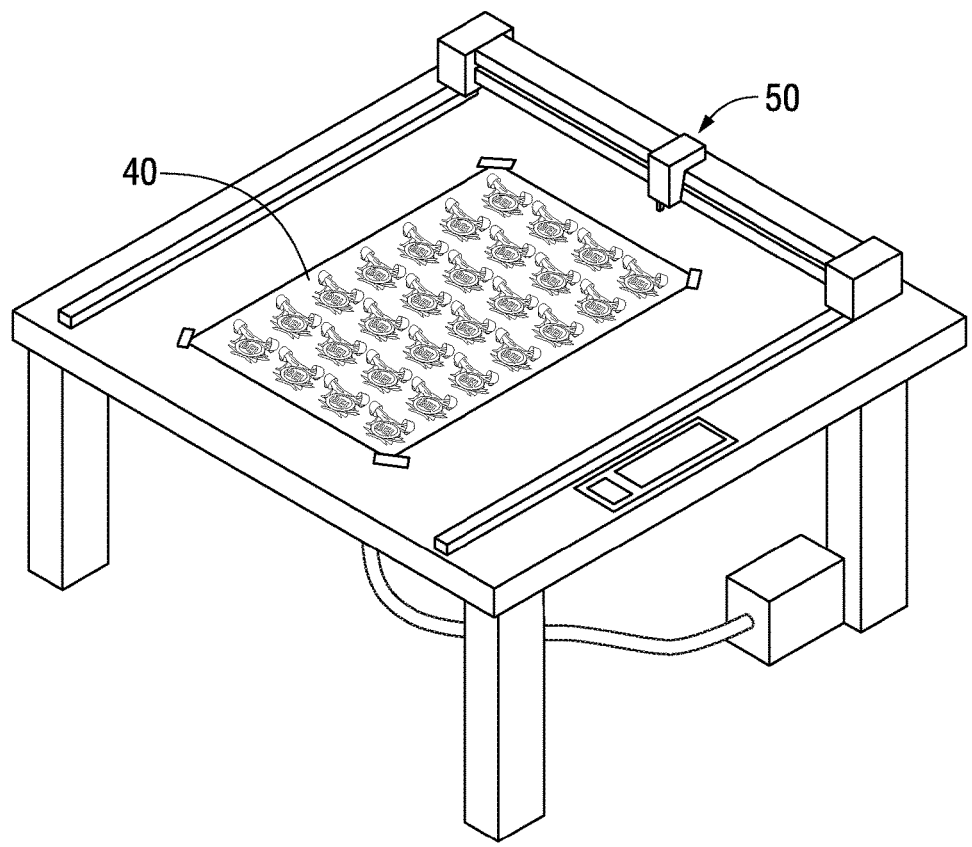
FIG. 18 is a perspective view of a sheet of exemplary decal artworks before being cut by a digital cutting plotter.

FIGS. 16 and 17 show an example of a final product of decal artwork 10 that is printed directly onto a base layer 20 of decal paper in one pass of the digital printer 100. The base layer 20 is, in an exemplary embodiment, a variation of white gum-coated paper having a coating of cornstarch and dextrose that is between approximately 10 to approximately 30 microns thick, more particularly, approximately 13 to approximately 20 microns thick, in particular, approximately 18 microns thick. Printed on top of the cornstarch/dextrose layer is a layer of lacquer as described in further detail below. Together, the cornstarch and dextrose and the lacquer create a bonding chemical that, when wetted with water, allows the digitally printed ink to slide off the base layer 20 and, after attachment, drying, and heating, form a permanent bond to a surface of the product 30 to which the decal is to be applied (see, e.g., FIG. 22). The bond is sufficient to attach permanently to many substrates, especially ceramic, metal (including stainless steel and aluminum), plastic, acrylic, wood, and glass, for example.

With this difference in the paper backing, a new first step is carried out. In particular, a lacquer is screen-printed on the paper utilizing a 350-mesh screen having a thickness of between approximately 150 and 300 micrometers, more particularly, between approximately 200 and 250 micrometers, in particular, approximately 214.6 micrometers (0.00845 inches). Accordingly, the cornstarch and dextrose layer is sandwiched between the paper backing and the lacquer. As such, when wetted with water, the water allows the lacquer to release from the paper backing with the cornstarch/dextrose layer acting along with the lacquer as an adhesive.

In an exemplary embodiment, the lacquer is Type DL170 clear gloss manufactured by Nazdar Ink Technologies. This particular lacquer is desirable because it has a very fast drying time and has chemical properties that allow digital printing ink to bond well to the lacquer. Desirably, the clear lacquer is Nitrocellulose based and Nitrocellulose lacquers produce a hard and flexible finish. In general, Nitrocellulose is used in plastic film and in ink and wood coatings and, therefore, the inventors discovered that this Nitrocellulose-based lacquer has a strong mechanical bonding with the dextrose/dextrin base. It is noted that lacquer Type DL170 is a substance that the decal printing industry has eschewed for many years because it was primarily used for making outdoor signage.

The lacquer is allowed to dry, which takes between approximately 30 and approximately 70 minutes.

The coated paper 22 (coated with the lacquer) is then placed on a digital printer 100, which is loaded with ink that is, for example rated as approximately 350% flexible. Then, if a white background is desired, a layer of white is printed over the entire sheet of paper or only at areas where decals are to be printed on the sheet. It is noted that, when a white background is printed before the colors of the artwork 10 are printed, the colors visually appear to "pop out" to the eye of the viewer. Thus, a white background is a common desired trait but it is not necessary for the processes described herein. In a particularly desirable embodiment, the color inks (including the white background) are UV-LED-cured inks, which dry instantly from the brief ultraviolet treatment. In particular, the inks are cured when exposed by UV LEDs for between approximately 1 second and approximately 3 seconds. One exemplary embodiment of such inks include the LUS 350 manufactured by MIMAKI USA, which are heat-resistant and flexible.

Next, the entirety of the full-color artwork 10 is printed directly onto the lacquer (or onto the white background that is already on top of the lacquer) to form a ready-decal sheet 40, a number of which are shown in FIG. 17, for example. It is known that the ink in such printing processes dries almost immediately (measured in seconds and not minutes). Therefore, all of the steps that were required previously to effect separate printing color layers and individual drying times are entirely eliminated and are condensed to a single printing step. There are no screens, there are no separations, there are no films, and no slip sheets are required. The color inks bond permanently to the lacquer immediately. This means that, unlike past printing processes, a clear overcoat layer to adhere all of the inks together and allow the inks to be removed from the paper is no longer necessary.

Thus, in an exemplary embodiment including the white background, the printed "sandwich" includes color inks on top of the white background on top of the lacquer on top of the cornstarch/dextrose on top of the paper backing. If desired, a single clear layer overcoat of ink can be applied on top of the lacquer layer to act as a protectant, for example, from surface scratching by a user.

Now, a decal 42 from the ready-decal sheet 40 is ready to be applied to a product 30. As compared to the prior art time-intensive processes that require drying time for each of the multiple layers, the digitally produced decal 42 herein is produced significantly faster; prior art decals took, on average, seven (7) to ten (10) days from start of printing until final product and the instant processes take from approximately 2 to approximately 4 hours from start of printing until final product. In summary, the decal paper 20 is flood-coated with the clear lacquer (which acts both as a carrier for the decal as well as a bonding agent to various object substrates), the paper 22 with the lacquer is then placed on a highly-advanced digital printer (such as a JFX200 type printer manufactured by MIMAKI USA) that is loaded with flexible inks (such as the LUS350 inks), and, if desired, a clear coating is applied above the inks. No other printing operations are needed. In real time, the decal is generated in a matter of minutes.

Figure 13:
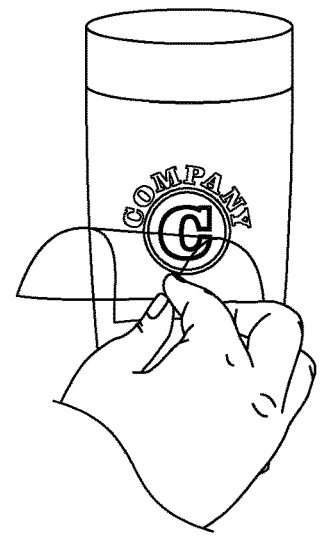
FIG. 13 is a photograph of a perspective view of the water bottle of FIG. 12 with the cover coat partially peeled off.
Figure 14:
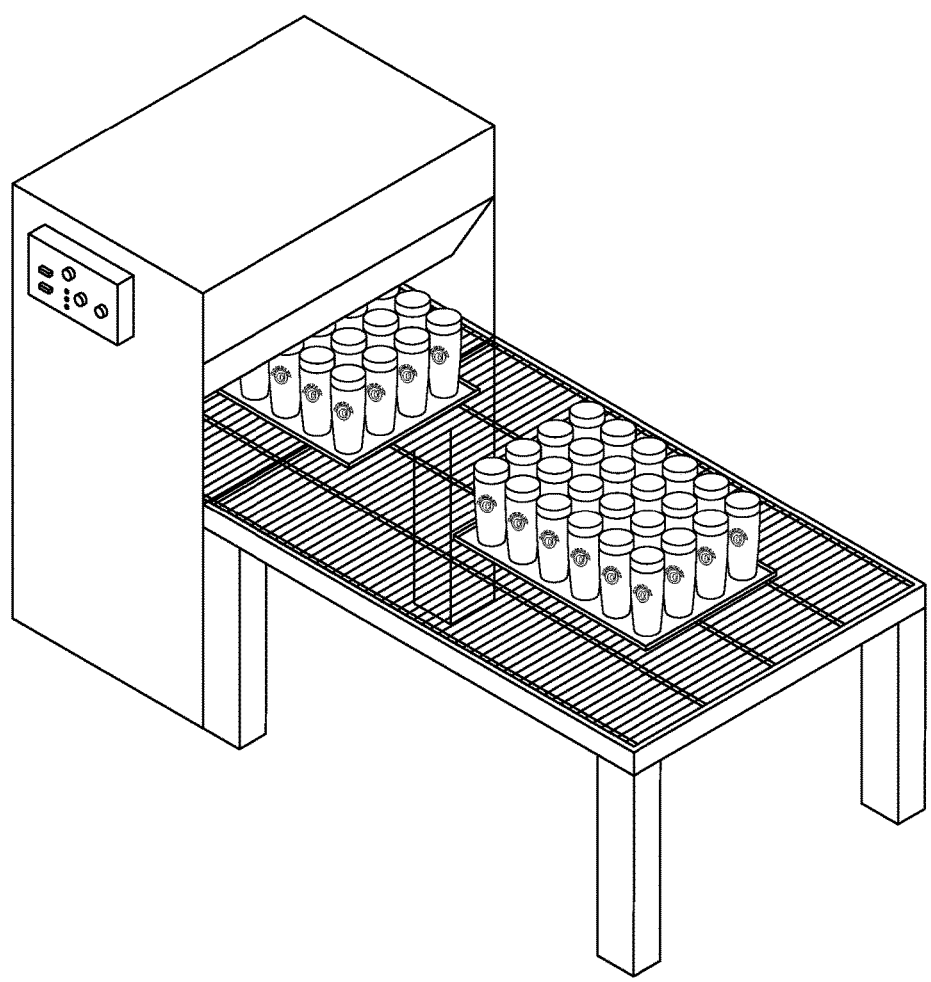
FIG. 14 is a photograph of a perspective view of an oven containing exemplary objects having decals made with the prior art CMYK screen-printing process.
Figure 19:
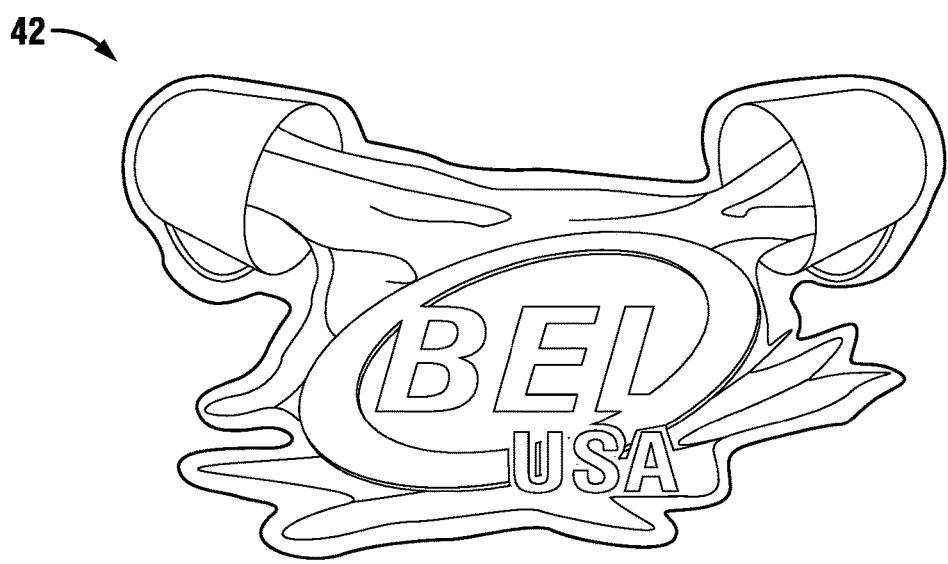
FIG. 19 is an exemplary embodiment of a finished decal after being cut by the digital cutting plotter.

After the print is complete, the ready-decal sheet 40 is removed and trimmed into individual decals 42. In an exemplary embodiment shown with regard to FIGS. 18 and 19, the ready-decal sheet 40 can be cut with a digital cutter 50 (i.e., a plotter) that directly contour-cuts around the actual logo, an finished example of a decal 42 is shown in FIG. 19. This means that the cover coat described with regard to FIG. 13 and was required in prior art processes is no longer needed, which also means that the physically intensive, hand-operator required step of removing the cover coat is entirely eliminated. With the decal 42 cut, it is now ready to be attached to the product 30.

As a general cleaning step, the surface of the product 30 to be decorated is prepared through the application of primers, flame, or alcohol depending on the material of the surface on which the decal 42 is to be fastened.

In a particularly desirable exemplary embodiment, a dishwasher additive is applied to the surface of the product 30 to be decorated to aid in permanent adhesion and to resist scratching and wear due to repeated dishwasher exposures. One exemplary embodiment of the dishwasher additive is Type 80 45160-MM Xpression Dishwasher Agent by FERRO GmbH. Typically, this additive is added to inks that cure in a range of 150° C. to 200° C. In the instant processes in contrast, this additive is brushed directly on the product 30 (e.g., the metal/ceramic/etc. surface) and the wet decal 42 is applied on top of the additive so that the additive will be sandwiched between the decal 42 and the product 30, thereby acting as a bonding agent and/or improving the bonding of the decal 42 to the product 30.

Figure 20:
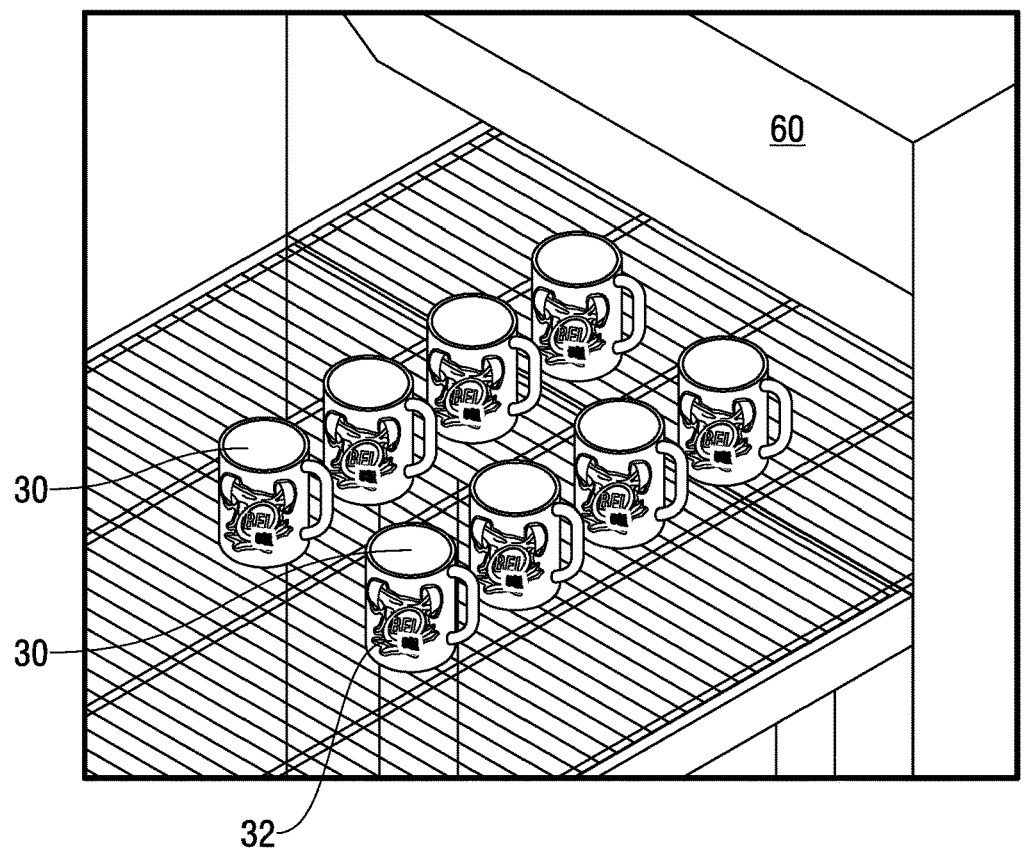
FIG. 20 is a perspective view of a set of unfinished products having finished decals applied thereon on a conveyor of an oven before being heated to finally apply the decal to the products.

To start the application process after the additive is brushed on the surface of the product 30, the decal 42 is placed in water for approximately 10 seconds. The water activates the glue on the base gum paper and softens the layers of ink. The decal 42 is slid off the base gum paper and is placed onto the unfinished product 32, an example of which is shown in FIG. 20 (with additional non-installed decals laying in front of the product 30). The decal 42 is allowed to dry in place on the product 30 for approximately 1 to approximately 2 hours. Any residue or other detritus is cleaned off the product 30 after the decal 42 is allowed dry. As shown in FIG. 20, the unfinished product 32 and the decal 42 applied thereon are, together, fired in an oven 60 at approximately 140° C. to approximately 200° C. for between approximately forty-five (45) and seventy-five (75) minutes, or more particularly, one of:

at approximately 150° C. for approximately forty-five (45) minutes;
at approximately 155° C. for approximately forty-five (45) minutes;
at approximately 160° C. for approximately forty-five (45) minutes;
at approximately 165° C. for approximately forty-five (45) minutes;
at approximately 150° C. for approximately fifty-five (55) minutes;
at approximately 155° C. for approximately fifty-five (55) minutes;
at approximately 160° C. for approximately fifty-five (55) minutes; and
at approximately 165° C. for approximately fifty-five (55) minutes.

Figure 21:
FIG. 21 is a perspective view of a finished product produced according to the systems and methods described herein.

A finished product 34 is shown in FIG. 21 with the decal 42 permanently attached thereto.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A method of creating a digitally printed, water-activated, peel-off and slide-on decal for permanent transfer to an object, comprising:
    printing a layer of lacquer on top of a base layer of gum-coated decal paper comprising a cornstarch and dextrose coating;
    drying the lacquer layer;
    printing a full-color artwork with digital, light-cured printing ink in one printing pass onto the lacquer layer to produce a ready-decal sheet having a decal formed by the ink and the lacquer layer, the lacquer layer bonding to the ink and being sandwiched between the cornstarch and dextrose coating and the ink;
    curing the ink with light;
    wetting the ready-decal sheet to release the decal from the base layer and to form an adhesive comprising the cornstarch and dextrose coating and the lacquer layer;
    sliding the decal from the base layer and placing the decal onto a surface of an object; and
    drying the object with the decal and then heating the object with the decal to form a permanent bond of the decal to the surface of the object.

2. The method according to claim 1, wherein:
    the cornstarch and dextrose coating has a thickness of between approximately 10 microns to approximately 30 microns;
    the lacquer layer is dried for no more than 90 minutes and the lacquer layer has a thickness of between approximately 150 micrometers and approximately 300 micrometers; and
    which further comprises drying the object with the decal for between approximately one hour and no more than approximately two hours and then heating the object with the decal for between approximately forty-five minutes and no more than approximately seventy-five minutes to form the permanent bond of the decal to the surface of the object.

3. The method according to claim 1, wherein the surface of the object comprises at least one of ceramic, metal, stainless steel, aluminum, plastic, acrylic, wood, and glass.

4. The method according to claim 1, which further comprising cleaning the surface of the object with at least one of a primer, flame, alcohol, and a dishwasher additive before placing the wetted ready-decal sheet onto the surface.

5. The method according to claim 1, which further comprises attaching the decal to the object without a user-removed, peel-off cover coat.

6. The method according to claim 2, which further comprises heating the object with the decal in an oven at between approximately 140° C. to approximately 200° C.

7. The method according to claim 6, which further comprises heating the object with the decal one of:
- at approximately 150° C. for approximately forty-five minutes;
- at approximately 155° C. for approximately forty-five minutes;
- at approximately 160° C. for approximately forty-five minutes;
- at approximately 165° C. for approximately forty-five minutes;
- at approximately 150° C. for approximately fifty-five minutes;
- at approximately 155° C. for approximately fifty-five minutes;
- at approximately 160° C. for approximately fifty-five minutes; and
- at approximately 165° C. for approximately fifty-five minutes.

8. The method according to claim 2, wherein the printing, drying, printing, curing, wetting, sliding, placing, drying, and heating steps are carried out between approximately two hours and no more than approximately four hours.

9. The method according to claim 1, wherein the cornstarch and dextrose coating is approximately 13 microns to approximately 20 microns thick.

10. The method according to claim 1, wherein the cornstarch and dextrose coating is approximately 18 microns thick.

11. The method according to claim 1, wherein printing of the artwork is carried out without separating colors into CMYK composites.

12. The method according to claim 1, wherein printing of the artwork is carried out without creating individual color printing screens.

13. The method according to claim 1, wherein printing of the artwork and printing of the lacquer are carried out without slip sheets.

14. The method according to claim 1, wherein the cornstarch and dextrose coating and the lacquer create a bonding chemical that, when wetted with water, allows the lacquer and the ink above the lacquer to slide off the base layer.

15. The method according to claim 1, wherein the ink is cured for between approximately 1 second and approximately 3 seconds.

16. The method according to claim 1, wherein the ink is cured with UV LEDs.

17. The method according to claim 1, which further comprises:
- printing a multiplicity of full-color artworks as individual decals on the lacquer layer to form the ready-decal sheet; and
- trimming the ready-decal sheet into separate individual decals.

18. The method according to claim 17, wherein trimming the ready-decal sheet is carried out by contour cutting each of the artworks into the separate individual decals.

19. The method according to claim 1, which further comprises carrying out the lacquer printing step with a 350-mesh screen to form the lacquer layer having a thickness between approximately 200 micrometers and approximately 250 micrometers.

20. The method according to claim 1, which further comprises drying the lacquer layer for more than approximately 30 minutes and less than approximately 70 minutes.

21. The method according to claim 1, which further comprises printing a layer of white digital printing ink onto the lacquer layer before printing the artwork onto the white digital printing ink.

22. The method according to claim 1, which further comprises printing a clear layer overcoat of digital, light-cured printing ink on top of the artwork as a scratch protectant.

* * * * *